United States Patent
Makino

(10) Patent No.: US 11,460,229 B2
(45) Date of Patent: Oct. 4, 2022

(54) AIR-CONDITIONING APPARATUS

(71) Applicant: Mitsubishi Electric Corporation, Tokyo (JP)

(72) Inventor: Hiroaki Makino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 99 days.

(21) Appl. No.: 16/976,568

(22) PCT Filed: Apr. 11, 2019

(86) PCT No.: PCT/JP2019/015795
§ 371 (c)(1),
(2) Date: Aug. 28, 2020

(87) PCT Pub. No.: WO2019/198795
PCT Pub. Date: Oct. 17, 2019

(65) Prior Publication Data
US 2021/0003330 A1    Jan. 7, 2021

(30) Foreign Application Priority Data

Apr. 12, 2018    (WO) .................. PCT/JP2018/015408

(51) Int. Cl.
*F25B 45/00*    (2006.01)
*F25B 9/00*    (2006.01)

(52) U.S. Cl.
CPC ............. *F25B 45/00* (2013.01); *F25B 9/002* (2013.01); *F25B 2345/001* (2013.01); *F25B 2345/002* (2013.01)

(58) Field of Classification Search
CPC .......... F25B 2345/001; F25B 2345/002; F25B 2345/006; F25B 2400/12; F25B 45/00
See application file for complete search history.

(56) References Cited

U.S. PATENT DOCUMENTS

2015/0040446 A1*  2/2015  Nakasu .................. G09F 3/02
40/625

FOREIGN PATENT DOCUMENTS

CN    204963324 U    1/2016
EP    2 853 825 A2    4/2015
(Continued)

OTHER PUBLICATIONS

Extended European Search Report dated Apr. 29, 2021 issued in corresponding European Patent Application No. 19785462.3.
(Continued)

*Primary Examiner* — Ana M Vazquez
(74) *Attorney, Agent, or Firm* — Posz Law Group, PLC

(57) ABSTRACT

An air-conditioning apparatus includes a refrigerant circuit that is formed of an outdoor unit and an indoor unit connected through indoor/outdoor connection pipes. The outdoor unit includes a compressor, an outdoor heat exchanger, and an expansion valve. The indoor unit includes an indoor heat exchanger. Combustible refrigerant is used as refrigerant flowing through the refrigerant circuit. The outdoor unit includes a refrigerant filling-dedicated connection port to fill the refrigerant and an evacuation-dedicated connection port to evacuate the refrigerant inside the refrigerant circuit. The refrigerant filling-dedicated connection port is provided inside a machine chamber that accommodates the compressor and the expansion valve, and the evacuation-dedicated connection port is provided outside the machine chamber.

13 Claims, 8 Drawing Sheets

(56) References Cited

FOREIGN PATENT DOCUMENTS

| | | |
|---|---|---|
| JP | H07-269904 A | 10/1995 |
| JP | 2010-002111 A | 1/2010 |
| JP | 2010-025459 A | 2/2010 |
| JP | 2016-029322 A | 3/2016 |

OTHER PUBLICATIONS

Office Action dated Jul. 27, 2021 issued in corresponding CN Patent Application No. 201980024180.8 (and English translation).
International Search Report of the International Searching Authority dated Jun. 18, 2019 for the corresponding international application No. PCT/JP2019/015795 (and English translation).
Office Action dated Dec. 28, 2021 issued in corresponding CN Patent Application No. 201980024180.8 (and English translation).
Decision of Rejection dated May 18, 2022 issued in corresponding CN Patent Application No. 201980024180.8 (and Machine Translation).

* cited by examiner

AIR-CONDITIONING APPARATUS

CROSS REFERENCE TO RELATED APPLICATION

This application is a U.S. national stage application of PCT/JP2019/015795 filed on Apr. 11, 2019, which claims priority to International Patent Application No. PCT/JP2018/015408 filed on Apr. 12, 2018, the contents of which are incorporated herein by reference.

TECHNICAL FIELD

The present disclosure relates to an air-conditioning apparatus in which combustible refrigerant is used.

BACKGROUND ART

In a related art air-conditioning apparatus, R410A that is hydrofluorocarbon (HFC) refrigerant is mainly used as refrigerant filled in a refrigerant circuit. Unlike hydrochlorofluorocarbon (HCFC) refrigerant such as R22 that has hitherto been used, ozone depletion potential (ODP) of R410A is zero. Therefore, R410A does not destroy an ozone layer. However, R410A tends to increase global warming potential (GWP). Accordingly, in recent years, switching of the refrigerant from the HFC refrigerant having high GWP such as R410A to the HFC refrigerant having low GWP such as R32 is under way as part of efforts to prevent global warming.

Many of the refrigerant having the low GWP are typically combustible. Therefore, in a case of using the refrigerant having the low GWP, it is necessary to pay attention to leakage of the refrigerant into the air. The combustibility ranges from low combustibility to high combustibility. Here, the refrigerant having the combustibility is generally referred to as combustible refrigerant.

If the combustible refrigerant is leaked into a room and the leaked refrigerant is stagnated in the room without being diffused, a refrigerant region with combustible density may be formed. If an ignition source is present near the refrigerant region of combustible density, the refrigerant may be ignited. To avoid occurrence of such ignition, it is necessary to prevent the refrigerant region with combustible density from being formed. Further, to prevent the refrigerant region with combustible density from being formed, it is necessary to suppress a leakage amount to a degree that does not form the refrigerant region with combustible density in an air-conditioned space even if leakage of the refrigerant occurs.

In a case where the refrigerant more than a necessary refrigerant amount is filled and leakage of the refrigerant occurs in the air-conditioning apparatus, the refrigerant region with combustible density may be formed as described above. Under such circumstances, Patent Literature 1 discloses an air-conditioning apparatus in which a refrigerant filling connection port is attached to a closing valve provided with a flare joint that connects a pipe connected to an indoor unit and a pipe connected to an outdoor unit, and a shape of the connection port is made different depending on a type of the used refrigerant, thereby preventing erroneous filling of the refrigerant. The refrigerant filling connection port is used for evacuation of the air inside the indoor unit and indoor/outdoor connection pipes connecting the outdoor unit and the indoor unit, in addition to filling of the refrigerant.

Patent Literature 2 discloses an air-conditioning apparatus in which a valve provided with a flare joint that connects a pipe connected to an indoor unit and a pipe connected to an outdoor unit is disposed inside a machine chamber of the outdoor unit. The valve is also provided with a connection port shared for filling of the refrigerant and for evacuation.

CITATION LIST

Patent Literature

Patent Literature 1: Japanese Unexamined Patent Application Publication No. H7-269904
Patent Literature 2: Japanese Unexamined Patent Application Publication No. 2010-25459

SUMMARY OF INVENTION

Technical Problem

In the air-conditioning apparatus disclosed in Patent Literature 1, the refrigerant filling connection port is provided outside the machine chamber of the outdoor unit because the refrigerant filling connection port is also used for evacuation of the indoor unit and the indoor/outdoor connection pipes. Accordingly, anybody can easily access the refrigerant filling connection port, and even a worker not having advanced technical knowledge can fill the refrigerant.

When the worker not having technical knowledge fills the refrigerant, however, erroneous work such as overfilling may occur. In a case where the refrigerant having high combustibility such as R290 (propane) is used as the refrigerant and the refrigerant is overfilled and leaked, if leakage of the refrigerant occurs in the closed space, possibility that density of the refrigerant in a partial region of the space reaches combustible density is increased. This may deteriorate safety.

Further, if the refrigerant is leaked from the flare joint that connects the indoor/outdoor connection pipes and is disposed inside the machine chamber as disclosed in Patent Literature 2, the leaked refrigerant may permeate the machine chamber storing an electric component that may serve as an ignition source.

The present disclosure is made in consideration of the above-described issues, and an object thereof is to provide an air-conditioning apparatus that can prevent erroneous work at the time of filling refrigerant, and can prevent leakage of combustible refrigerant by the erroneous work.

Solution to Problem

An air-conditioning apparatus of an embodiment of the present disclosure includes a refrigerant circuit that is formed of an outdoor unit and an indoor unit connected through indoor/outdoor connection pipes. The outdoor unit includes a compressor, an outdoor heat exchanger, and an expansion valve. The indoor unit includes an indoor heat exchanger. Combustible refrigerant is used as refrigerant flowing through the refrigerant circuit. The outdoor unit includes a refrigerant filling-dedicated connection port to fill the refrigerant and an evacuation-dedicated connection port to evacuate the refrigerant inside the refrigerant circuit. The refrigerant filling-dedicated connection port is provided inside a machine chamber that accommodates the compressor and the expansion valve, and the evacuation-dedicated connection port is provided outside the machine chamber.

Advantageous Effects of Invention

According to the embodiment of the present disclosure, the refrigerant filling-dedicated connection port and the evacuation-dedicated connection port are separately provided, and the refrigerant filling-dedicated connection port is provided inside the machine chamber. This makes it possible to prevent erroneous work at the time of filling the refrigerant, and to suppress leakage of combustible refrigerant due to the erroneous work.

DESCRIPTION OF EMBODIMENTS

Embodiment 1

Figure 1:
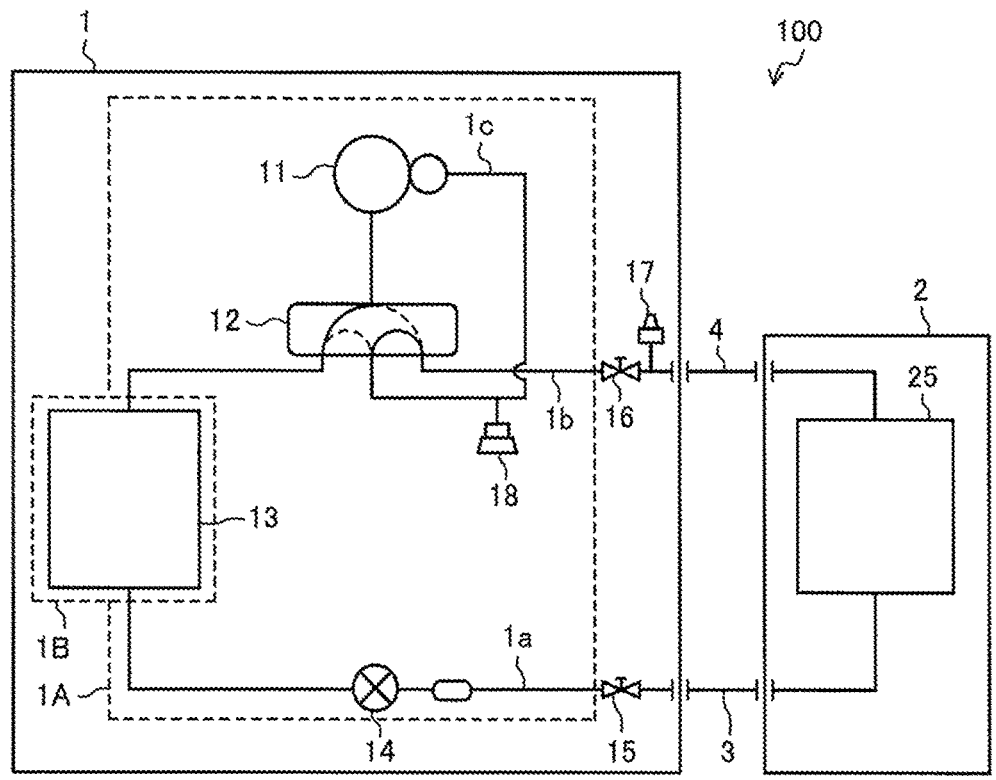
FIG. 1 is a schematic view illustrating an exemplary configuration of an air-conditioning apparatus according to Embodiment 1.

An air-conditioning apparatus according to Embodiment 1 of the present disclosure is described below. FIG. 1 is a schematic view illustrating an exemplary configuration of an air-conditioning apparatus 100 according to Embodiment 1. As illustrated in FIG. 1, the air-conditioning apparatus 100 is, for example, a split type air-conditioning apparatus, and includes an outdoor unit 1 and an indoor unit 2. The outdoor unit 1 and the indoor unit 2 are connected by indoor/outdoor connection pipes 3 and 4 to configure a refrigerant circuit.

[Configuration of Air-Conditioning Apparatus 100]
(Outdoor Unit 1)

The outdoor unit 1 includes a compressor 11, a refrigerant flow switching device 12, an outdoor heat exchanger 13, and an expansion valve 14. An internal space of the outdoor unit 1 is divided into a machine chamber 1A and an air-sending chamber 1B. The compressor 11, the refrigerant flow switching device 12, and the expansion valve 14 are accommodated in the machine chamber 1A. The outdoor heat exchanger 13 is accommodated in the air-sending chamber 1B.

The compressor 11 sucks low-temperature low-pressure refrigerant, compresses the sucked refrigerant, and discharges high-temperature high-pressure refrigerant. The compressor 11 includes, for example, an inverter compressor that changes a compressor frequency to control a capacity as a feed amount per unit time.

The refrigerant flow switching device 12 is, for example, a four-way valve, and switches a flowing direction of the refrigerant to switch operation between cooling operation and heating operation. During the cooling operation, the refrigerant flow switching device 12 is switched to connect a discharge side of the compressor 11 and the outdoor heat exchanger 13 as illustrated by a solid line in FIG. 1. During the heating operation, the refrigerant flow switching device 12 is switched to connect the discharge side of the compressor 11 and an indoor heat exchanger 25 of the indoor unit 2 as illustrated by a dashed line in FIG. 1.

The outdoor heat exchanger 13 causes heat exchange to be performed between outdoor air supplied by a non-illustrated fan or the like and the refrigerant. During the cooling operation, the outdoor heat exchanger 13 functions as a condenser that dissipates heat of the refrigerant to the outdoor air, thereby condensing the refrigerant. During the heating operation, the outdoor heat exchanger 13 functions as an evaporator that evaporates the refrigerant to cool the outdoor air by vaporization heat at the time of evaporation.

The expansion valve 14 expands the refrigerant. The expansion valve 14 includes a valve, an opening degree of which is controllable, such as an electronic expansion valve.

The outdoor unit 1 further includes a liquid pipe closing valve 15, a gas pipe closing valve 16, an evacuation-dedicated connection port 17, and a refrigerant filling-dedicated connection port 18. The liquid pipe closing valve 15 is attached to a pipe 1a between the expansion valve 14 and the indoor heat exchanger 25 of the indoor unit 2, and opens/closes a flow path between the expansion valve 14 and the indoor heat exchanger 25. The gas pipe closing valve 16 is attached to a pipe 1b between the refrigerant flow switching device 12 and the indoor heat exchanger 25, and opens/closes a flow path between the refrigerant flow switching device 12 and the indoor heat exchanger 25.

The evacuation-dedicated connection port 17 is a connection port to which a vacuum pump is connected in evacuation. The evacuation-dedicated connection port 17 is disposed outside an outer shell 10 of the machine chamber 1A. In Embodiment 1, the evacuation-dedicated connection port 17 is provided in the gas pipe closing valve 16.

The refrigerant filling-dedicated connection port 18 is a connection port used to fill the refrigerant in the refrigerant circuit. The refrigerant filling-dedicated connection port 18 is disposed inside the machine chamber 1A. The refrigerant filling-dedicated connection port 18 is attached to a pipe 1c that connects the refrigerant flow switching device 12 and a suction side of the compressor 11.

The attachment position of the refrigerant filling-dedicated connection port 18 is not limited thereto, and the refrigerant filling-dedicated connection port 18 may be attached to the pipe 1b that connects the gas pipe closing valve 16 and the refrigerant flow switching device 12. In other words, taking into consideration a case where the refrigerant flow switching device 12 is not provided, it is sufficient for the refrigerant filling-dedicated connection port 18 to be attached to a pipe that connects the suction side of the compressor 11 and the gas pipe closing valve 16.

Figure 2:
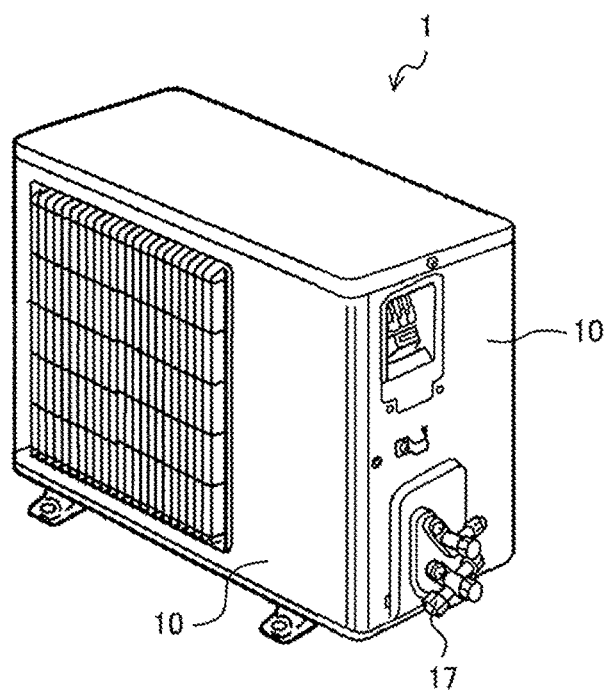
FIG. 2 is a perspective view illustrating an exemplary appearance of an outdoor unit illustrated in FIG. 1.

FIG. 2 is a perspective view illustrating an exemplary appearance of the outdoor unit 1 illustrated in FIG. 1. As illustrated in FIG. 2, the outdoor unit 1 has, for example, the rectangular outer shell 10, and a part of the outer shell 10 is detachable. The evacuation-dedicated connection port 17 is disposed to be exposed to outside of the outer shell 10. In contrast, the refrigerant filling-dedicated connection port 18 is disposed in the unillustrated machine chamber 1A inside the outdoor unit 1 to be exposed when a part of the outer shell 10 is detached.

(Indoor Unit 2)

The indoor unit 2 illustrated in FIG. 1 includes the indoor heat exchanger 25. The indoor heat exchanger 25 causes heat exchange to be performed between air supplied by an unillustrated fan or the like and the refrigerant. As a result, heating air or cooling air to be supplied to an indoor space is generated. The indoor heat exchanger 25 functions as an evaporator that cools the air in an air-conditioned space to perform cooling during the cooling operation. Further, the indoor heat exchanger 25 functions as a condenser that heats the air in the air-conditioned space to perform heating during the heating operation.

[Structure of Connection Port]

(Structure of Evacuation-Dedicated Connection Port 17)

Figure 3:
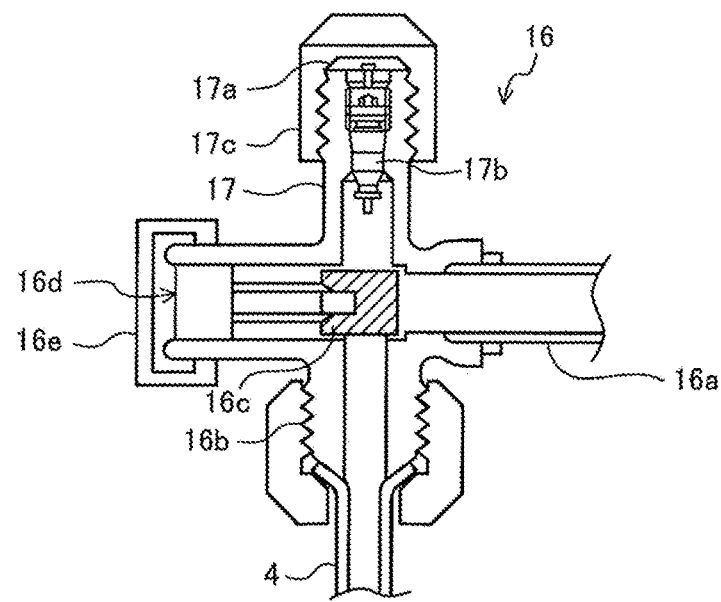
FIG. 3 is a schematic cross-sectional view illustrating an exemplary structure of a gas pipe closing valve including an evacuation-dedicated connection port illustrated in FIG. 1.

FIG. 3 is a schematic cross-sectional view illustrating an exemplary structure of the gas pipe closing valve 16 including the evacuation-dedicated connection port 17 illustrated in FIG. 1. The gas pipe closing valve 16 is provided with an outdoor unit-side connection port 16a, a gas pipe-side connection port 16b, and the evacuation-dedicated connection port 17.

The pipe 1b connected to the refrigerant flow switching device 12 is connected to the outdoor unit-side connection port 16a. The indoor/outdoor connection pipe 4 connected to the indoor unit 2 is connected to the gas pipe-side connection port 16b. A hose or the like of the non-illustrated vacuum pump for evacuation is connected to the evacuation-dedicated connection port 17.

The evacuation-dedicated connection port 17 is provided with a screw part on an outer periphery, and is provided with a conical front end part 17a inclined at about 45 degrees, as with a related art port. A cylindrical internal space having the screw part is provided at a center of the evacuation-dedicated connection port 17, and a valve core 17b is disposed inside the internal space.

When the hose of the vacuum pump is not connected, a cap 17c is fastened to the evacuation-dedicated connection port 17 by a screw. An inner surface of the cap 17c is formed in a conical shape inclined at about 45 degrees to correspond to the front end part 17a. As a result, a seal surface is formed between the cap 17c and the front end part 17a of the evacuation-dedicated connection port 17, which prevents leakage of the refrigerant.

Further, the gas pipe closing valve 16 is provided with a valve part 16c and an opening port 16d. The valve part 16c opens/closes a refrigerant flow path between the refrigerant flow switching device 12 and the indoor/outdoor connection pipe 4. The opening port 16d allows for operation of the valve part 16c. When the valve part 16c is not operated, the opening port 16d is closed by a protection cap 16e.

(Refrigerant Filling-Dedicated Connection Port 18)

Figure 4:
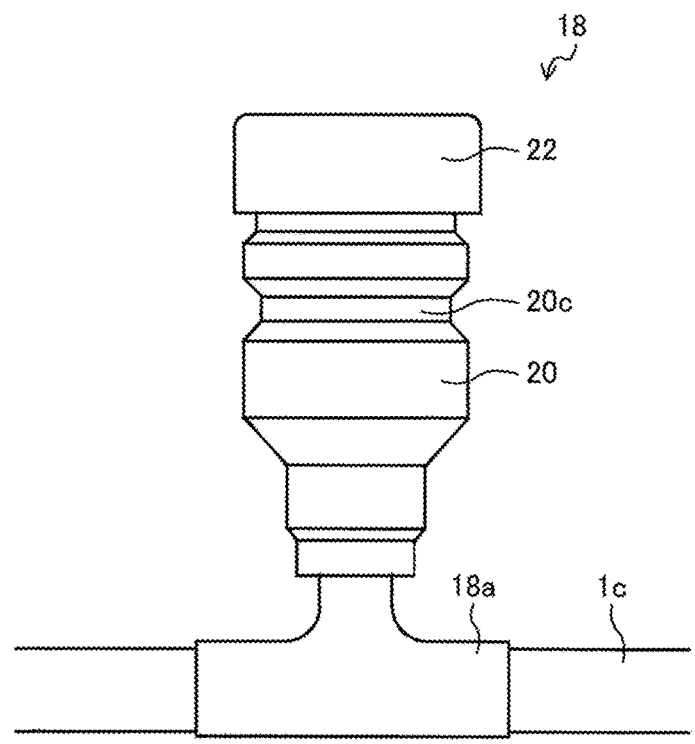
FIG. 4 is a schematic view illustrating an exemplary shape of a refrigerant filling-dedicated connection port illustrated in FIG. 1.
Figure 5:
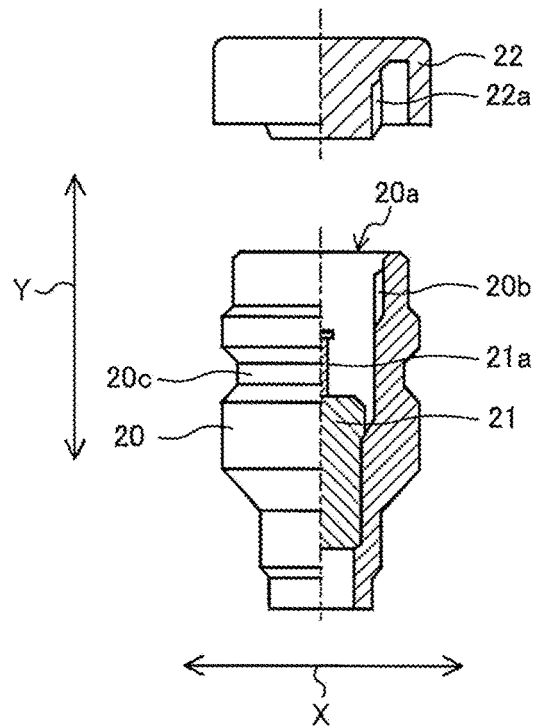
FIG. 5 is a schematic cross-sectional view illustrating an exemplary structure of a charge valve forming the refrigerant filling-dedicated connection port illustrated in FIG. 4.

FIG. 4 is a schematic view illustrating an exemplary shape of the refrigerant filling-dedicated connection port 18 illustrated in FIG. 1. FIG. 5 is a schematic cross-sectional view illustrating an exemplary structure of a charge valve 20 forming the refrigerant filling-dedicated connection port 18 illustrated in FIG. 4. A quick joint 30 is connected to the refrigerant filling-dedicated connection port 18 when the refrigerant circuit is filled in the refrigerant. The quick joint 30 is attached to a front end of a hose that is connected to a tool such as a gage manifold. As illustrated in FIG. 4, the refrigerant filling-dedicated connection port 18 includes the charge valve 20 and is provided on the pipe 1c. The charge valve 20 is joined to the pipe 1c by a bifurcation pipe 18a to bifurcate the flow of the refrigerant flowing through the pipe 1c.

As illustrated in FIG. 4 and FIG. 5, the charge valve 20 has a cylindrical shape, and is provided with an opening port 20a to which the quick joint 30 is connected. A valve-side screw part 20b is provided on an inner periphery of the opening port 20a.

A cylindrical internal space through which fluid passes is provided at a center of the charge valve 20, and a valve core 21 is disposed inside the internal space. A pin 21a extending in an insertion/removal direction (arrow Y direction in FIG. 5) is provided on the opening port 20a side of the valve core 21. When the quick joint 30 is connected to the charge valve 20, the pin 21a is pressed and the valve core 21 is accordingly opened, which enables the fluid to pass through the charge valve 20.

The charge valve 20 is provided with a groove 20c along the outer periphery. The groove 20c is to fix the quick joint 30 when the quick joint 30 is connected.

Further, a cap 22 is detachably attached to the opening port 20a. The cap 22 is made of, for example, a metal material. When the quick joint 30 is not connected to the charge valve 20, the cap 22 is attached to the opening port 20a. The cap 22 is provided with a cap-side screw part 22a at a position corresponding to the valve-side screw part 20b of the charge valve 20. When the cap-side screw part 22a and the valve-side screw part 20b of the charge valve 20 are screwed to each other, the cap 22 closely contacts with the charge valve 20.

(Configuration of Tool 50)

Figure 6:
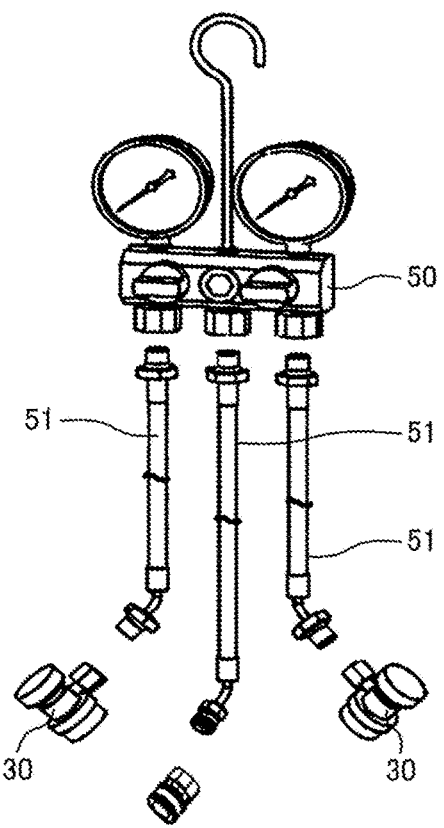
FIG. 6 is a schematic view illustrating an exemplary configuration of a tool to be connected to the refrigerant filling-dedicated connection port illustrated in FIG. 4.

FIG. 6 is a schematic view illustrating an exemplary configuration of a tool 50 to be connected to the refrigerant filling-dedicated connection port 18 illustrated in FIG. 4. FIG. 6 illustrates an example in a case where a gage manifold is used as the tool 50.

A hose 51 is attached to the gage manifold as the tool 50. The quick joint 30 that connects the hose 51 to the charge valve 20 of the refrigerant filling-dedicated connection port 18 is attached to a front end of the hose 51. In particular, in Embodiment 1, a gage manifold for combustible refrigerant is used. In this case, a connected portion between the gage manifold for the combustible refrigerant and the hose 51 and a connected portion between the hose 51 and the quick joint 30 are fastened by a tool such as a spanner, unlike a related art connected portion manually fastened.

(Structure of Quick Joint 30)

Figure 7:
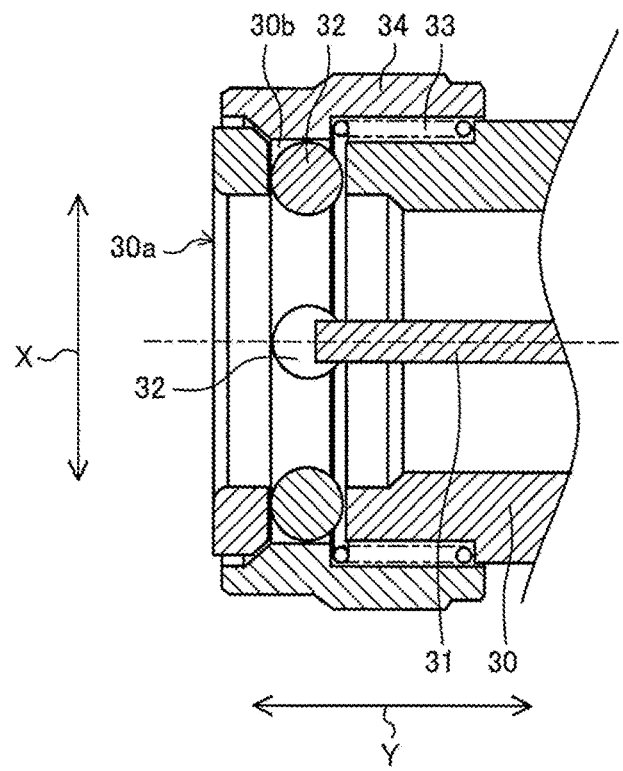
FIG. 7 is a schematic cross-sectional view illustrating an exemplary structure of a quick joint illustrated in FIG. 6.

FIG. 7 is a schematic cross-sectional view illustrating an exemplary structure of the quick joint 30 illustrated in FIG. 6. As illustrated in FIG. 7, the quick joint 30 has a cylindrical shape, and is provided with an opening port 30a to which the charge valve 20 illustrated in FIG. 4 and FIG. 5 is connected. A cylindrical internal space through which the fluid passes is provided at a center of the quick joint 30, and a rod-shaped protrusion 31 that protrudes in an insertion/removal direction (arrow Y direction in FIG. 7) is provided in the internal space.

The protrusion 31 is provided so as to push the pin 21a that is provided at the valve core 21 inside the charge valve 20 when the charge valve 20 is connected to the quick joint 30. When the charge valve 20 is connected to the quick joint 30, the protrusion 31 opens the valve core 21 to allow the fluid to pass through the charge valve 20.

On the outer periphery on the opening port 30a side of the quick joint 30, through holes 30b are bored, and balls 32 as locking parts are provided in the respective through holes 30b. The balls 32 are movable in a radial direction (arrow× direction) of the quick joint 30 inside the respective through holes 30b. Each of the through holes 30b has a structure in which the corresponding ball 32 does not fall in the internal space.

Further, on the outer periphery on the opening port 30a side of the quick joint 30, a spring 33 is wound and a sleeve 34 is provided to cover the balls 32. The sleeve 34 is slidable in the insertion/removal direction (arrow Y direction) on the outer periphery of the quick joint 30 along with expansion and contraction of the spring 33.

The balls 32 are regulated in movement in the outer peripheral direction (arrow×direction) by being covered with the sleeve 34. At this time, the balls 32 are regulated in movement while each of the balls 32 partially protrudes to the internal space. In contrast, when the spring 33 is contracted and the sleeve 34 is moved to the direction opposite to the opening port 30a side, the regulation of the movement of the balls 32 by the sleeve 34 is released. As a result, the balls 32 become movable in the outer peripheral direction (arrow X direction).

[Connection between Charge Valve 20 and Quick Joint 30]

Figure 8:
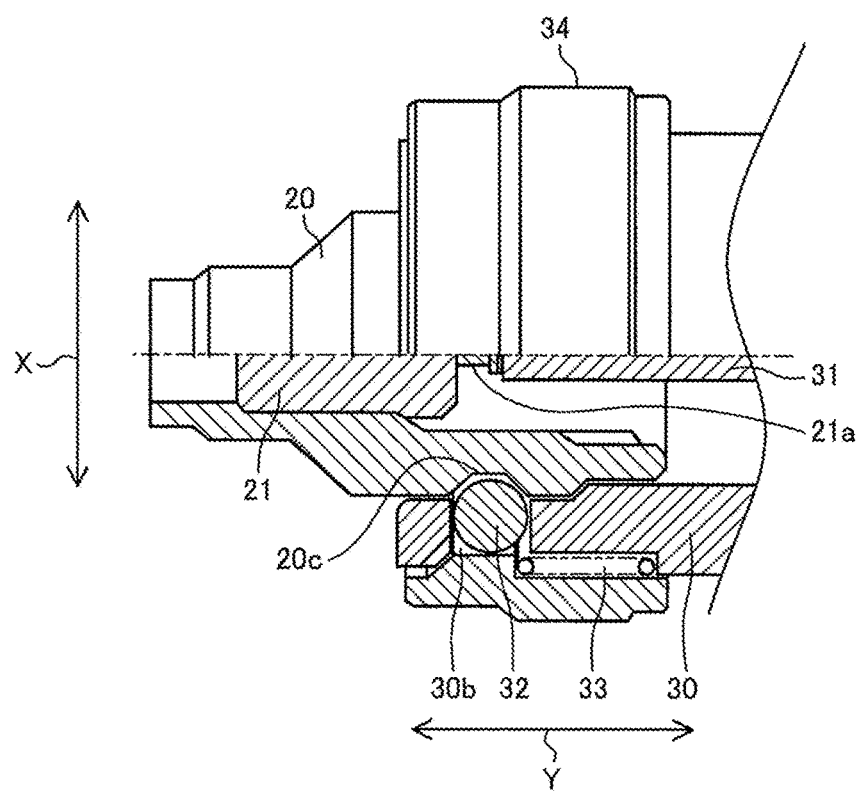
FIG. 8 is a schematic cross-sectional view illustrating a state where the charge valve in FIG. 5 and the quick joint in FIG. 7 are connected.

FIG. 8 is a schematic cross-sectional view illustrating a state where the charge valve 20 in FIG. 5 and the quick joint 30 in FIG. 7 are connected. First, as illustrated in FIG. 8, in a case where the quick joint 30 is connected to the charge valve 20, the charge valve 20 is inserted into the quick joint 30.

At this time, the sleeve 34 of the quick joint 30 is slid in the direction opposite to the opening port 30a to contract the spring 33. As a result, the regulation of the movement of the balls 32 is released along with movement of the sleeve 34. Further, when the charge valve 20 is inserted into the quick joint 30, force is applied to the balls 32 from the internal space side of the quick joint 30, and the balls 32 are moved in the outer peripheral direction by the force.

When the charge valve 20 is correctly inserted into the quick joint 30, the position of the groove 20c of the charge valve 20 and the positions of the balls 32 of the quick joint 30 are coincident with each other, and the balls 32 protrude to the internal space side and engage with the groove 20c. Thereafter, when the sleeve 34 is slid toward the opening port 30a, the movement of the balls 32 is regulated, and the balls 32 are locked to the groove 20c. As a result, the quick joint 30 is fixed to the charge valve 20.

Further, when the charge valve 20 is inserted into the quick joint 30, the pin 21a of the valve core 21 in the charge valve 20 is pushed by the protrusion 31 of the quick joint 30. Therefore, the valve core 21 is released, and the fluid can pass through the internal spaces of both of the charge valve 20 and the quick joint 30.

To detach the quick joint 30 from the charge valve 20, the sleeve 34 is slid in the direction opposite to the opening port 30a to contract the spring 33, and the regulation of the movement of the balls 32 is accordingly released. When the quick joint 30 is pulled out in this state, the balls 32 engaged with the groove 20c are moved in the outer peripheral direction by force from the internal space side, and are disengaged from the groove 20c.

Further, when the quick joint 30 is pulled out from the charge valve 20, the protrusion 31 is moved in the direction opposite to the opening port 30a, and the pin 21a of the valve core 21 is not pushed by the protrusion 31. As a result, the valve core 21 is closed. Note that the quick joint 30 includes a non-illustrated valve, and the valve is also closed when the quick joint 30 is pulled out from the charge valve 20. As a result, flowing of the fluid to the internal spaces of both of the charge valve 20 and the quick joint 30 is blocked.

[Installation of Air-Conditioning Apparatus 100]

(Evacuation)

To newly install the air-conditioning apparatus 100, the outdoor unit 1 and the indoor unit 2 are first connected by the indoor/outdoor connection pipes 3 and 4. At this time, the liquid pipe closing valve 15 and the gas pipe closing valve 16 of the outdoor unit 1 are closed.

The hose connected to the vacuum pump is connected to the evacuation-dedicated connection port 17, and evacuation is then performed. After the evacuation ends, the liquid pipe closing valve 15 and the gas pipe closing valve 16 are opened to allow the refrigerant to flow into the indoor unit 2. As a result, the air-conditioning apparatus 100 is turned to be operable.

As described above, the tool such as the gage manifold similar to the tool in the existing air-conditioning apparatus can be used in the evacuation. This facilitates the installation work without requiring a special work tool in the evacuation.

(Filling of Refrigerant)

For example, in a case where the refrigerant inside the air-conditioning apparatus 100 is extracted for repair, replacement, or the like of a refrigerant circuit component, the refrigerant is refilled in the air-conditioning apparatus 100. Further, for example, in a case where the indoor/outdoor connection pipes 3 and 4 are long in the installation and an amount of refrigerant previously filled is insufficient for operation, the refrigerant is additionally filled in the air-conditioning apparatus 100.

In a case where filling of the refrigerant is necessary as described above, a part of the outer shell 10 of the machine chamber 1A is first detached to expose the refrigerant filling-dedicated connection port 18 provided inside the machine chamber 1A to the outside. Further, in a state where the refrigerant filling-dedicated connection port 18 is accessible, the tool 50 such as the gage manifold to fill the combustible refrigerant is connected to the refrigerant filling-dedicated connection port 18, and the refrigerant is filled in the air-conditioning apparatus 100.

At this time, a refrigerant tank and the hose 51 with the quick joint 30 attached at the front end are connected to the gage manifold as the tool 50. Further, after the air inside the gage manifold and the hose 51 is pushed out by the refrigerant and is exhausted, the quick joint 30 at the front end of the hose 51 is connected to the charge valve 20 of the refrigerant filling-dedicated connection port 18, and the refrigerant is filled in the air-conditioning apparatus 100. The refrigerant is filled in the air-conditioning apparatus 100 while a filling amount is measured.

As described above, when the quick joint 30 is connected to the charge valve 20, the quick joint 30 is pushed into the charge valve 20 to immediately establish connection. Accordingly, as compared with the existing connection method by a screw, it is possible to suppress a leakage amount of the refrigerant in connection.

Note that a left-hand screw is used for a mouthpiece of the tank of the combustible refrigerant such as R290 (propane). In contrast, a right-hand screw is used for a mouthpiece of the tank of noncombustible refrigerant such as R410A. As described above, a fastening direction of the screw used for the mouthpiece of the refrigerant tank is different depending on the combustibility of the refrigerant, which prevents mix-up of the refrigerant.

As described above, in Embodiment 1, the charge valve 20 that is different from the existing valve is used as the valve of the refrigerant filling-dedicated connection port 18. As a result, a worker other than a worker having technical knowledge cannot easily work, which makes it possible to prevent erroneous work at the time of filling the refrigerant.

Further, in Embodiment 1, the charge valve 20 is used for the refrigerant filling-dedicated connection port 18, and the quick joint 30 is used for the tool 50 that is used at the time of filling the refrigerant. This makes it possible to reduce the leakage amount of the refrigerant in attachment and detachment as compared with connection by the screw in the existing technology.

As described above, in the air-conditioning apparatus 100 according to Embodiment 1, the evacuation-dedicated connection port 17 and the refrigerant filling-dedicated connection port 18 are separately provided, the evacuation-dedicated connection port 17 is provided outside the machine chamber 1A of the outdoor unit 1, and the refrigerant filling-dedicated connection port 18 is provided inside the machine chamber 1A. To access the refrigerant filling-dedicated connection port 18, it is necessary to detach a part of the outer shell 10 of the machine chamber 1A. As a result, the refrigerant is filled by the procedure different from the procedure in the existing technology. This makes it possible to prevent anybody from easily filling the refrigerant. Since erroneous work by the worker other than the worker having technical knowledge is prevented, it is possible to prevent leakage of the refrigerant at the time of filling the refrigerant.

Further, in the air-conditioning apparatus 100 according to Embodiment 1, the charge valve 20 to which the quick joint 30 provided to the tool 50 is connected is used as the refrigerant filling-dedicated connection port 18. Thus, since the worker uses the tool different from the tool in the related art technology to fill the refrigerant by the work procedure different from the related art work procedure, the refrigerant can be filled only by the worker having advanced technical knowledge. This makes it possible to prevent overfilling of the refrigerant and erroneous filling of the different type of the refrigerant. In addition, as compared with the connection method by the screw used in the existing air-conditioning apparatus, the leakage amount of the refrigerant when the quick joint 30 is attached/detached can be suppressed, which makes it possible to prevent the leaked refrigerant from permeating the machine chamber 1A.

Further, in the air-conditioning apparatus 100 according to Embodiment 1, the refrigerant filling-dedicated connection port 18 is attached to the pipe 1b or 1c that connects the suction side of the compressor 11 and the gas pipe closing valve 16. Therefore, the refrigerant filling-dedicated connection port 18 is provided on the compressor 11 side of the gas pipe closing valve 16 provided outside the outdoor unit 1, namely, the refrigerant filling-dedicated connection port 18 is provided inside the outdoor unit 1. In other words, it is necessary to access the inside of the outdoor unit 1 to access the refrigerant filling-dedicated connection port 18. This makes it possible to prevent anybody from easily filling the refrigerant.

Embodiment 2

Next, Embodiment 2 of the present disclosure is described. Embodiment 2 is different from Embodiment 1 in that the refrigerant filling-dedicated connection port 18 is housed in a housing unit inside the machine chamber 1A. In Embodiment 2, components common to the components in Embodiment 1 are denoted by the same reference numerals, and detailed description of the components is omitted.

[Configuration of Air-Conditioning Apparatus 200]

Figure 9:
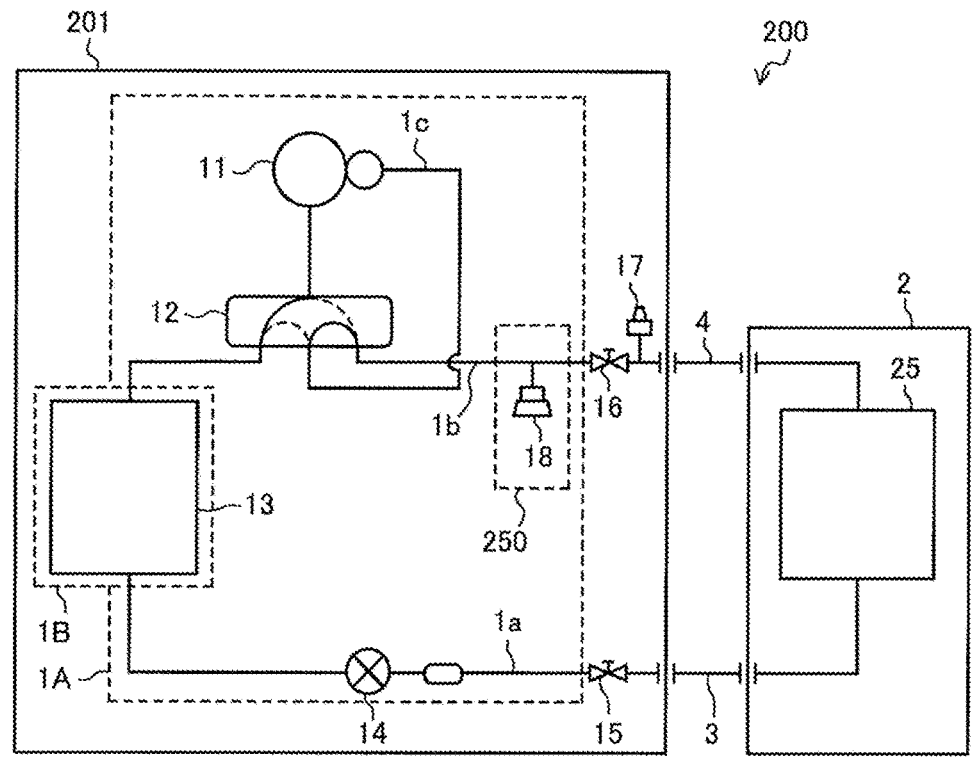
FIG. 9 is a schematic view illustrating an exemplary configuration of an air-conditioning apparatus according to Embodiment 2.

FIG. 9 is a schematic view illustrating an exemplary configuration of an air-conditioning apparatus 200 according to Embodiment 2. As illustrated in FIG. 9, the air-conditioning apparatus 200 includes an outdoor unit 201 and the indoor unit 2. The outdoor unit 201 and the indoor unit 2 are connected by the indoor/outdoor connection pipes 3 and 4 to form a refrigerant circuit.

(Outdoor Unit 201)

As in Embodiment 1, the outdoor unit 201 includes the compressor 11, the refrigerant flow switching device 12, and the expansion valve 14 that are accommodated in the machine chamber 1A, and the outdoor heat exchanger 13 accommodated in the air-sending chamber 1B. The outdoor unit 201 further includes the liquid pipe closing valve 15, the gas pipe closing valve 16, the evacuation-dedicated connection port 17, and the refrigerant filling-dedicated connection port 18.

As in Embodiment 1, the evacuation-dedicated connection port 17 is disposed outside the outer shell 10 of the machine chamber 1A, and is provided in the gas pipe closing valve 16. The refrigerant filling-dedicated connection port 18 is disposed inside the machine chamber 1A. In Embodiment 2, the refrigerant filling-dedicated connection port 18 is attached to the pipe 1b that connects the gas pipe closing valve 16 and the refrigerant flow switching device 12.

The attachment position of the refrigerant filling-dedicated connection port 18 is not limited thereto, and the refrigerant filling-dedicated connection port 18 may be attached to the pipe 1c that connects the refrigerant flow switching device 12 and the suction side of the compressor 11. In other words, taking into consideration the case where the refrigerant flow switching device 12 is not provided, it is sufficient for the refrigerant filling-dedicated connection port 18 to be attached to a pipe that connects the suction side of the compressor 11 and the gas pipe closing valve 16.

A housing unit 250 is provided inside the machine chamber 1A. The housing unit 250 is provided such that an internal space does not communicate with the internal space of the machine chamber 1A, and the refrigerant filling-dedicated connection port 18 is housed in the housing unit 250.

(Housing Unit 250)

Figure 10:
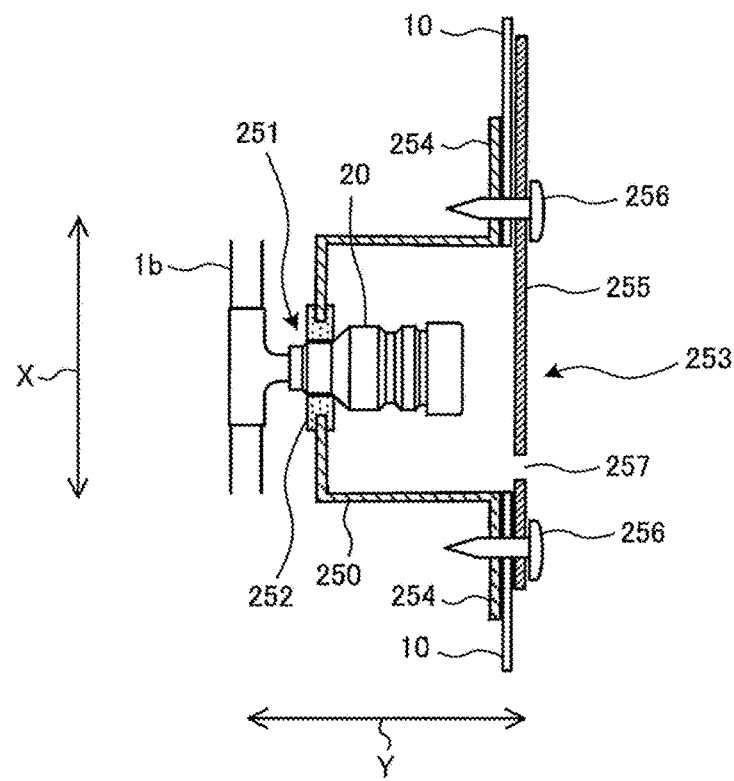
FIG. 10 is a schematic cross-sectional view illustrating an exemplary structure of a housing unit illustrated in FIG. 9.

FIG. 10 is a schematic cross-sectional view illustrating an exemplary structure of the housing unit 250 illustrated in FIG. 9. As illustrated in FIG. 10, the housing unit 250 is formed in a box shape having the internal space, and the charge valve 20 of the refrigerant filling-dedicated connection port 18 is housed in the internal space.

In the housing unit 250, for example, a circular valve insertion port 251 is provided on one of two side surfaces perpendicular to an arrow Y direction in FIG. 10. A diameter of the valve insertion port 251 is made larger than a diameter of the charge valve 20. The charge valve 20 of the refrigerant filling-dedicated connection port 18 is housed in the internal space of the housing unit 250 by being inserted from the valve insertion port 251.

In a state where the charge valve 20 is housed in the housing unit 250, a seal part 252 is provided in a gap between the valve insertion port 251 and the charge valve 20. The seal part 252 is made of an elastic material such as rubber, and is formed in a circular shape having a diameter larger than the diameter of the valve insertion port 251. In addition, the seal part 252 is formed to be divided into, for example, semicircular parts. Further, the seal part 252 includes a step part that has a diameter smaller than the diameter of the seal part 252, along a circumferential direction near a center in a width direction (arrow Y direction in FIG. 10).

After the charge valve 20 is inserted from the valve insertion port 251, the seal part 252 is fitted into and attached to the valve insertion port 251 in a manner to sandwich the charge valve 20 by the divided parts of the seal part 252. At this time, the seal part 252 is attached such that the step part is fitted into an end part of the valve insertion port 251.

When the seal part 252 is attached in the above-described manner, the gap between the valve insertion port 251 and the charge valve 20 is closed. As a result, the internal space of the housing unit 250 is shut off from the space of the machine chamber 1A. Accordingly, even in the case where leakage of the refrigerant occurs at the time of filling the refrigerant, it is possible to prevent the refrigerant from flowing into the machine chamber 1A. Further, since the seal part 252 is attached to sandwich the charge valve 20, the charge valve 20 can be fixed to the housing unit 250.

The other side surface of the housing unit 250 serves as an opening port surface 253 communicating with the outside of the outdoor unit 201, and a flange 254 that extends outward is provided at an end part of the opening port surface 253. The outer shell 10 of the outdoor unit 201 is provided with an opening port. The housing unit 250 is attached such that the opening port surface 253 is coincident with the opening port of the outer shell 10.

Further, the opening port surface 253 is provided with a lid 255 that covers the opening port surface 253. The lid 255 is detachably attached to be detached when the tool 50 to fill the refrigerant is connected to the charge valve 20. The lid 255 is attached together with the flange 254 of the housing unit 250, to the outer shell 10 of the outdoor unit 201 by fastening tools 256 such as screws.

As described above, since the lid 255 is provided to the housing unit 250, the refrigerant filling-dedicated connection port 18 can be easily accessed only by detaching the lid 255, which makes it possible to improve workability at the time of filling the refrigerant. Further, in a normal state, the refrigerant filling-dedicated connection port 18 cannot be seen from outside. Therefore, the refrigerant filling-dedicated connection port 18 cannot be easily accessed, and erroneous work at the time of filling the refrigerant can be prevented.

The lid 255 is provided with a slit-shaped communication hole 257. The communication hole 257 is provided to cause the internal space of the housing unit 250 to communicate with the outside of the outdoor unit 201 even in a state where the lid 255 is attached to the housing unit 250. Accordingly, even if the refrigerant is leaked from the charge valve 20 of the refrigerant filling-dedicated connection port 18, the leaked refrigerant is released to the outside through the communication hole 257. This makes it possible to prevent the refrigerant from permeating the internal space of the housing unit 250 and the machine chamber 1A.

Figure 11:
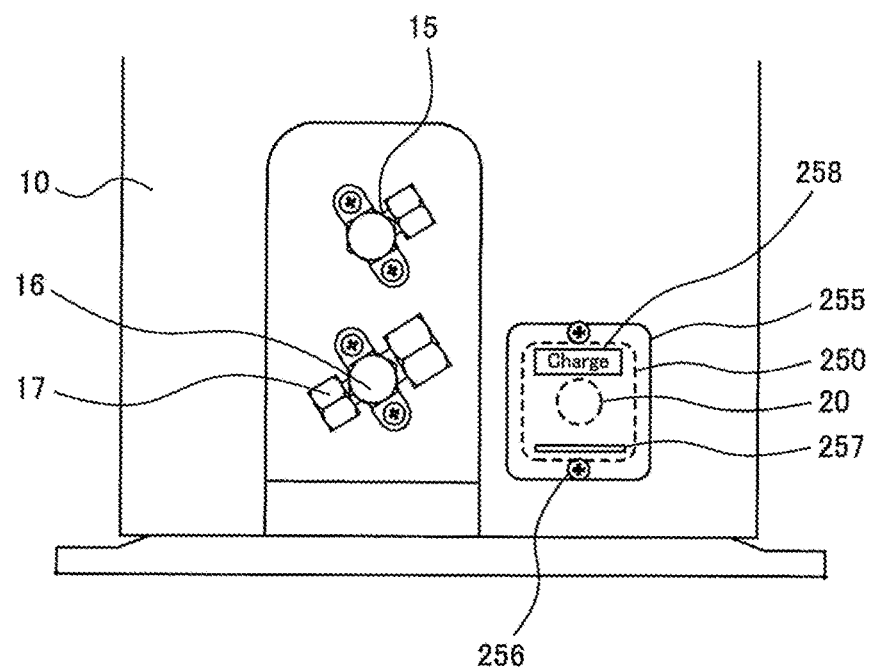
FIG. 11 is a schematic view illustrating an exemplary appearance of an outdoor unit when a lid in FIG. 10 is viewed from a front side.

FIG. 11 is a schematic view illustrating an exemplary appearance of the outdoor unit 201 when the lid 255 in FIG. 10 is viewed from a front side. In FIG. 11, to facilitate description, the housing unit 250 and the charge valve 20 provided on a rear side of the lid 255 are illustrated by dashed lines.

As illustrated in FIG. 11, a display unit 258 is provided on a front surface of the lid 255. The display unit 258 displays that the charge valve 20 of the refrigerant filling-dedicated connection port 18 is housed inside the housing unit 250. The display of the display unit 258 is not limited to the display representing that the charge valve 20 is housed in the housing unit 250, and for example, the display unit 258 may display to attract attention to the refrigerant filling port. This makes it possible to improve safety at the time of filling the refrigerant.

(Structure of Cap 222)

Figure 12:
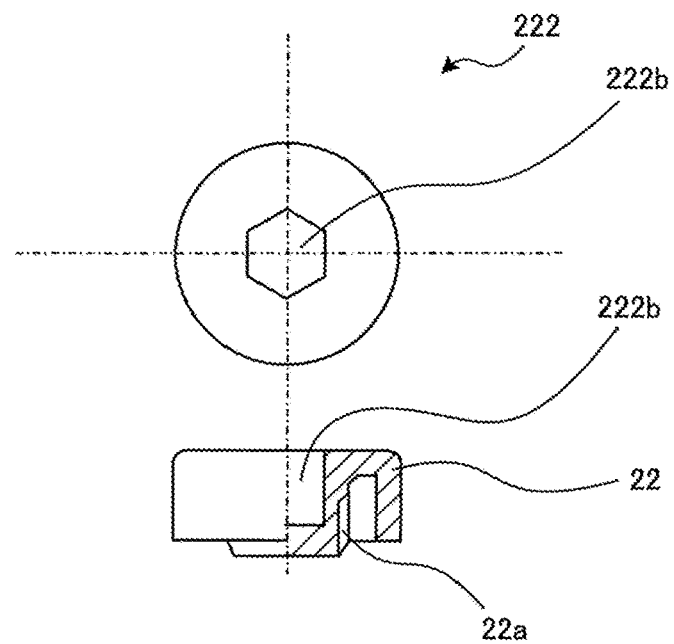
FIG. 12 is a schematic view illustrating an exemplary structure of a cap to be attached to a charge valve forming a refrigerant filling-dedicated connection port illustrated in FIG. 9.

FIG. 12 is a schematic view illustrating an exemplary structure of a cap 222 to be attached to the charge valve 20 configuring the refrigerant filling-dedicated connection port 18 illustrated in FIG. 9. As with the cap 22 according to Embodiment 1, the cap 222 is detachably attached to the opening port 20a of the charge valve 20, and is provided with a cap-side screw part 22a that is screwed to the valve-side screw part 20b of the charge valve 20. The cap 222 is made of a metal material such as brass to secure prescribed strength. The cap 222 is attached to the opening port 20a when the quick joint 30 is not connected to the charge valve 20.

Further, as illustrated in FIG. 12, the cap 222 is provided with a fastening groove 222b. The fastening groove 222b has a hexagonal horizontal cross-section to enable the cap 222 to be fastened to the charge valve 20 by a hexagonal wrench.

[Installation of Air-Conditioning Apparatus 200]

(Evacuation)

The evacuation at the time when the air-conditioning apparatus 200 according to Embodiment 2 is newly installed is similar to the evacuation of the air-conditioning apparatus 100 according to Embodiment 1. Therefore, in the air-conditioning apparatus 200, the evacuation is performed using an existing tool such as the gage manifold for R22 or R410A. This facilitates the installation work without requiring a special work tool in the evacuation.

(Filling of Refrigerant)

In the air-conditioning apparatus 200, refilling and additional filling of the refrigerant are performed in a manner similar to the air-conditioning apparatus 100 according to Embodiment 1. In a case where filling of the refrigerant is necessary, the lid 255 of the housing unit 250 is first detached, and the charge valve 20 of the refrigerant filling-dedicated connection port 18 provided inside the housing unit 250 is exposed to the outside. Further, in the state where the refrigerant filling-dedicated connection port 18 is accessible, the tool 50 such as the gage manifold to fill the combustible refrigerant is connected to the refrigerant filling-dedicated connection port 18, and the refrigerant is filled in the air-conditioning apparatus 200 as in Embodiment 1.

The charge valve 20 and the cap 222 are fastened by engagement between the cap-side screw part 22a of the cap 222 of the charge valve 20 and the valve-side screw part 20b of the charge valve 20. As illustrated in FIG. 12, the cap 222 is provided with the fastening groove 222b that allows for opening/closing by the hexagonal wrench. Accordingly, in Embodiment 2, the cap 222 can be loosened and detached by the hexagonal wrench.

As described above, in Embodiment 2, the housing unit 250 that has the internal space shut off from the machine chamber 1A is provided in the machine chamber 1A, and the charge valve 20 of the refrigerant filling-dedicated connection port 18 is housed inside the housing unit 250. As a result, even if the refrigerant is leaked from the refrigerant filling-dedicated connection port 18, it is possible to prevent the leaked refrigerant from flowing into the machine chamber 1A because the housing unit 250 does not communicate with the machine chamber 1A.

As described above, in the air-conditioning apparatus 200 according to Embodiment 2, the refrigerant filling-dedicated connection port 18 is housed in the housing unit 250 that is provided inside the machine chamber 1A of the outdoor unit 201 and has the internal space shut off from the internal space of the machine chamber 1A. Accordingly, as in Embodiment 1, the erroneous work by the worker other than the worker having technical knowledge is prevented, which makes it possible to suppress leakage of the refrigerant at the time of filling the refrigerant. Further, even if the refrigerant is leaked from the refrigerant filling-dedicated connection port 18, it is possible to prevent the leaked refrigerant from flowing into the machine chamber 1A because the housing unit 250 does not communicate with the machine chamber 1A.

In the air-conditioning apparatus 200, the lid 255 provided so as to cover the opening port surface 253 of the housing unit 250 is provided with the communication hole 257 communicating with the outside. As a result, even if the refrigerant is leaked from the refrigerant filling-dedicated connection port 18, the refrigerant permeating the housing unit 250 is released to the outside through the communication hole 257. Accordingly, it is possible to prevent a charging unit such as a control substrate provided inside the machine chamber 1A from contacting with the combustible refrigerant.

In the air-conditioning apparatus 200, the lid 255 is provided with the display unit 258 displaying that the refrigerant filling-dedicated connection port 18 is housed in the housing unit 250. This enables the position of the refrigerant filling-dedicated connection port 18 to be easily determined.

In the air-conditioning apparatus 200, the refrigerant filling-dedicated connection port 18 includes the cap 222 provided with the hexagonal fastening groove 222b. Accordingly, the cap 222 can be attached to and detached from the refrigerant filling-dedicated connection port 18 by the hexagonal wrench.

Embodiment 3

Next, Embodiment 3 of the present disclosure is described. Embodiment 3 is different from Embodiments 1 and 2 in that the charge valve 20 is used both for the evacuation and for filling of the refrigerant. Note that, in Embodiment 3, components common to the components in Embodiments 1 and 2 are denoted by the same reference numerals, and detailed description of the components is omitted.

[Configuration of Air-Conditioning Apparatus 300]

Figure 13:
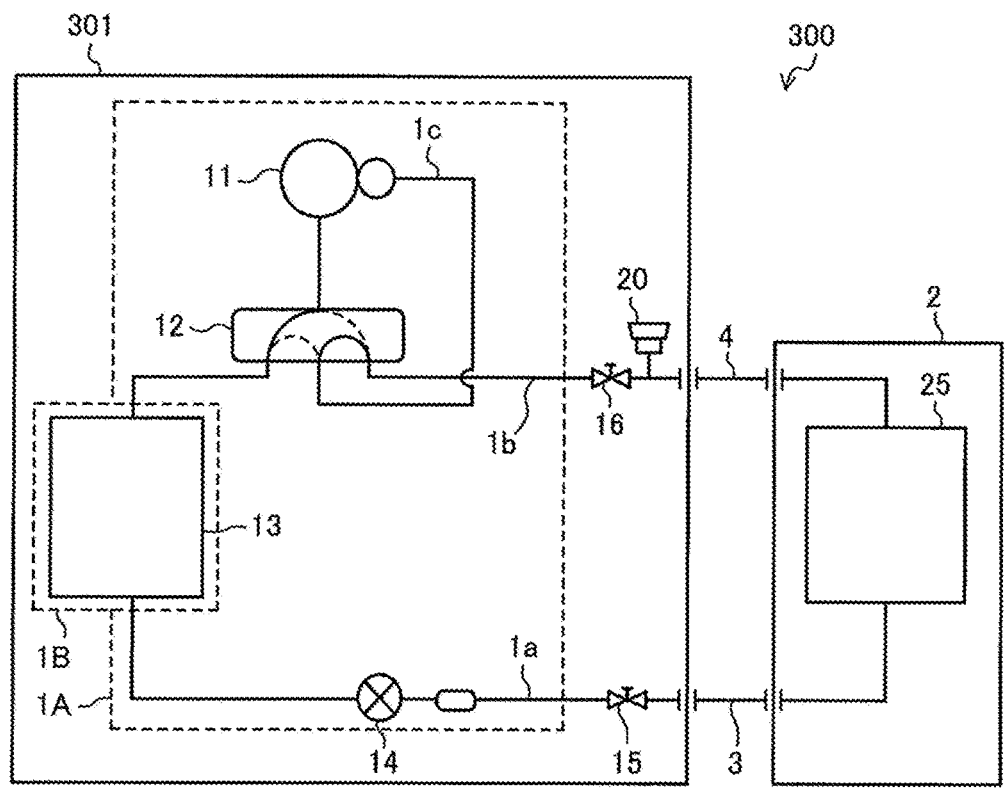
FIG. 13 is a schematic view illustrating an exemplary configuration of an air-conditioning apparatus according to Embodiment 3.
Figure 14:
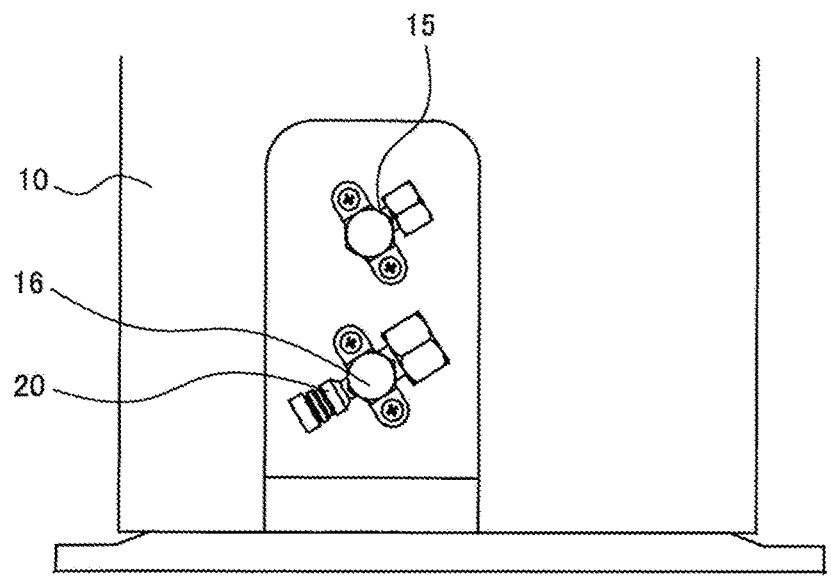
FIG. 14 is a schematic view illustrating an exemplary appearance of an outdoor unit 301 illustrated in FIG. 13.

FIG. 13 is a schematic view illustrating an exemplary configuration of an air-conditioning apparatus 300 according to Embodiment 3. FIG. 14 is a schematic view illustrating an exemplary appearance of an outdoor unit 301 illustrated in FIG. 13. As illustrated in FIG. 13, the air-conditioning apparatus 300 includes the outdoor unit 301 and the indoor unit 2. The outdoor unit 301 and the indoor unit 2 are connected by the indoor/outdoor connection pipes 3 and 4 to configure a refrigerant circuit.

(Outdoor Unit 301)

As in Embodiments 1 and 2, the outdoor unit 301 includes the compressor 11, the refrigerant flow switching device 12, and the expansion valve 14 that are accommodated in the machine chamber 1A, and the outdoor heat exchanger 13 accommodated in the air-sending chamber 1B. The outdoor unit 301 further includes the liquid pipe closing valve 15, the gas pipe closing valve 16, and the charge valve 20.

As illustrated in FIG. 14, the charge valve 20 is provided integrally with the gas pipe closing valve 16, and is disposed outside the outer shell 10 of the machine chamber 1A. In Embodiment 3, the charge valve 20 is used for the evacuation and for filling of the refrigerant. In other words, in Embodiment 3, the evacuation-dedicated connection port 17 and the refrigerant filling-dedicated connection port 18 in Embodiments 1 and 2 are used in common. To perform the evacuation and filling of the refrigerant, the gage manifold for the combustible refrigerant is connected as the tool 50 to the charge valve 20.

(Structure of Cap 322)

Figure 15:
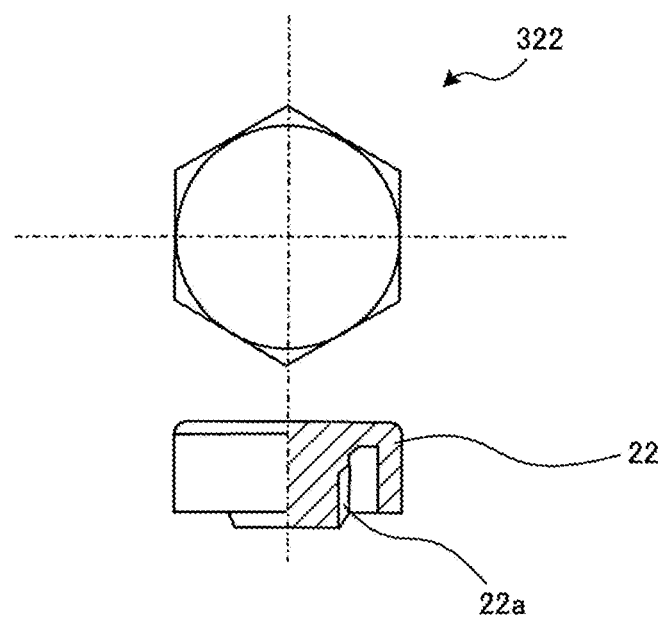
FIG. 15 is a schematic view illustrating an exemplary structure of a cap to be attached to a charge valve illustrated in FIG. 13.

FIG. 15 is a schematic view illustrating an exemplary structure of a cap 322 to be attached to the charge valve 20 illustrated in FIG. 13. The cap 322 is detachably attached to the opening port 20a of the charge valve 20. As in Embodiments 1 and 2, the cap 322 includes the cap-side screw part 22a that engages with the valve-side screw part 20b of the charge valve 20.

As illustrated in FIG. 15, the cap 322 is formed in, for example, a hexagonal shape. Accordingly, the cap 322 can be attached/detached by a spanner or other tools. The cap 322 is made of a metal material such as brass to secure prescribed strength. The cap 322 is attached to the opening port 20a when the quick joint 30 is not connected to the charge valve 20.

[Evacuation and Filling of Refrigerant]

In Embodiment 3, the evacuation and filling of the refrigerant are both performed by connecting the tool 50 such as the gage manifold to the charge valve 20 provided integrally with the gas pipe closing valve 16. The specific work for the evacuation and for filling of the refrigerant is similar to the work in Embodiments 1 and 2.

As described above, when the worker uses the tool 50 for the combustible refrigerant also in the evacuation, the worker performs the work while recognizing that the refrigerant used in the air-conditioning apparatus 300 is the combustible refrigerant. Accordingly, in Embodiment 3, as compared with the work of the air-conditioning apparatus using noncombustible refrigerant, it is possible to bring the worker to attention at the time of the installation work of the air-conditioning apparatus 300 or the work for filling of the refrigerant.

When the tool different from the existing tool is used, the worker receives an education on tool usage and an accompanying education. This provides an opportunity to improve knowledge to the worker, which improves safety of the work. Further, in Embodiment 3, since the existing tool cannot be connected, it is possible to prevent erroneous sealing of the refrigerant.

As described above, in the air-conditioning apparatus 300 according to Embodiment 3, the connection port for the evacuation and the connection port for filling of the refrigerant are used in common. This makes it possible to simplify the configuration of the air-conditioning apparatus 300.

Further, since the charge valve 20 is used as the connection port of the tool 50, only the worker having advanced technical knowledge can fill the refrigerant as in Embodiments 1 and 2, which makes it possible to prevent erroneous sealing of the refrigerant.

Although Embodiments 1 to 3 of the present disclosure are described above, the present disclosure is not limited to Embodiments 1 to 3 described above, and various modifications and applications can be made without departing from the scope of the present disclosure. For example, the cap 22 provided to the refrigerant filling-dedicated connection port 18 according to Embodiment 1 may include the fastening groove 222*b* having the hexagonal horizontal cross-section as in Embodiment 2, or may be formed in the hexagonal shape as in Embodiment 3.

REFERENCE SIGNS LIST

1, 201, 301 outdoor unit 1A machine chamber 1B air-sending chamber
1*a*, 1 *b*, 1*c* pipe 2 indoor unit 3, 4 indoor/outdoor connection pipe 10 outer shell 11 compressor 12 refrigerant flow switching device 13 outdoor heat exchanger 14 expansion valve 15 liquid pipe closing valve 16 gas pipe closing valve 16*a* outdoor unit-side connection port 16*b* gas pipe-side connection port 16*c* valve part 16*d* opening port 16*e* protection cap 17 evacuation-dedicated connection port 17*a* front end part 17*b* valve core
17*c* cap 18 refrigerant filling-dedicated connection port 18*a* bifurcation pipe 20 charge valve 20*a* opening port 20*b* valve-side screw part
20*c* groove part 21 valve core 21*a* pin 22, 222, 322 cap 22*a* cap-side screw part 25 indoor heat exchanger 30 quick joint 30*a* opening port 30*b* through hole 31 protrusion 32 ball 33 spring 34 sleeve 50 tool 51 hose 100, 200, 300 air-conditioning apparatus
222*b* fastening groove 250 housing unit 251 valve insertion port 252 seal part 253 opening port surface 254 flange 255 lid 256 fastening tool 257 communication hole 258 display unit

The invention claimed is:

1. An air-conditioning apparatus including a refrigerant circuit that is formed of an outdoor unit and an indoor unit connected through indoor/outdoor connection pipes, the outdoor unit including a compressor, an outdoor heat exchanger, and an expansion valve, the indoor unit including an indoor heat exchanger, wherein
combustible refrigerant is used as refrigerant flowing through the refrigerant circuit, and
the outdoor unit includes a refrigerant filling-dedicated connection port to fill the refrigerant and an evacuation-dedicated connection port to evacuate the refrigerant inside the refrigerant circuit, the refrigerant filling-dedicated connection port being provided inside a machine chamber that accommodates the compressor and the expansion valve, the evacuation-dedicated connection port being provided outside the machine chamber.

2. The air-conditioning apparatus of claim 1, wherein a charge valve to which a quick joint of a refrigerant filling tool is connected is used as the refrigerant filling-dedicated connection port.

3. The air-conditioning apparatus of claim 1, wherein a refrigerant filling-dedicated connection port is attached to a pipe connecting a suction side of the compressor and a gas pipe closing valve that is provided to a pipe between the suction side of the compressor and the indoor heat exchanger.

4. The air-conditioning apparatus of claim 3, wherein
the outdoor unit further includes a refrigerant flow switch configured to switch a flow of the refrigerant discharged from the compressor, and
the refrigerant filling-dedicated connection port is attached to a pipe connecting the refrigerant flow switch and the suction side of the compressor.

5. The air-conditioning apparatus of claim 3, wherein
the outdoor unit further includes a refrigerant flow switch configured to switch a flow of the refrigerant discharged from the compressor, and
the refrigerant filling-dedicated connection port is attached to a pipe connecting the gas pipe closing valve and the refrigerant flow switch.

6. The air-conditioning apparatus of claim 1, wherein
the outdoor unit further includes, inside the machine chamber, a housing unit that has an internal space shut off from an internal space of the machine chamber, and
the refrigerant filling-dedicated connection port is housed in the housing unit.

7. The air-conditioning apparatus of claim 6, wherein
the housing unit includes an opening port surface communicating with outside of the outdoor unit, and a lid provided to cover the opening port surface, and
the lid is provided with a communication hole communicating with the outside.

8. The air-conditioning apparatus of claim 6, wherein the lid includes a display unit configured to display that the refrigerant filling-dedicated connection port is housed in the housing unit.

9. The air-conditioning apparatus of claim 1, wherein the refrigerant filling-dedicated connection port includes a cap provided with a hexagonal fastening groove.

10. The air-conditioning apparatus of claim 1, wherein the refrigerant filling-dedicated connection port includes a hexagonal cap.

11. The air-conditioning apparatus of claim 1, wherein the evacuation-dedicated connection port is configured such that the refrigerant can be evacuated, via the evacuation-dedicated connection port, from the refrigerant circuit to outside the refrigerant circuit.

12. The air-conditioning apparatus of claim 1, wherein:
the outdoor unit further comprises an outer shell, and
an inner side of the outer shell faces the machine chamber and an outer side of the outer shell faces away from the machine chamber.

13. The air-conditioning apparatus of claim 12, wherein the evacuation-dedicated connection port is located outside the machine chamber on the outer side of the outer shell and the refrigerant filling-dedicated connection port is located inside the machine chamber on the inner side of the outer shell.

* * * * *